J. W. & E. H. HAASE.
PNEUMATIC TIRE.
APPLICATION FILED NOV. 7, 1910.
1,009,966.
Patented Nov. 28, 1911.
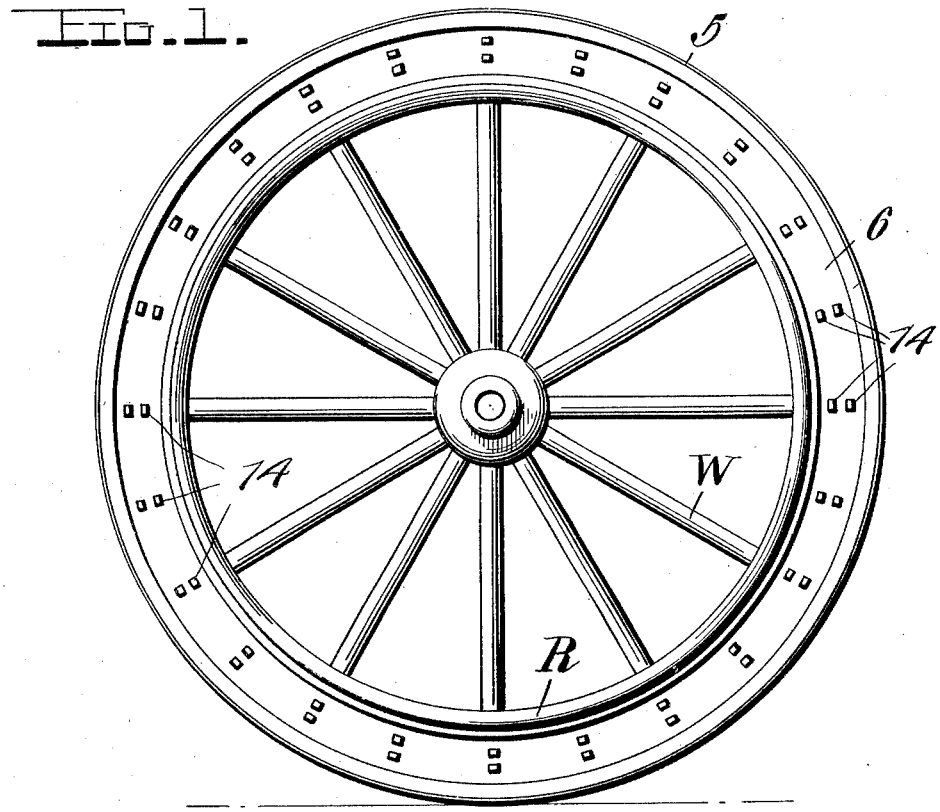
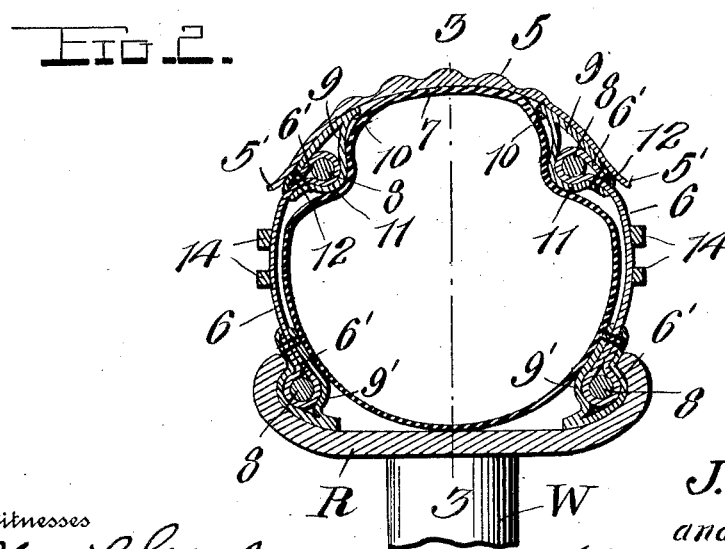

UNITED STATES PATENT OFFICE.

JOHN W. HAASE AND ERNEST H. HAASE, OF AMHERST, NEBRASKA.

PNEUMATIC TIRE.

1,009,966.  Specification of Letters Patent.  Patented Nov. 28, 1911.

Application filed November 7, 1910. Serial No. 591,196.

*To all whom it may concern:*

Be it known that we, JOHN W. HAASE and ERNEST H. HAASE, citizens of the United States, residing at Amherst, in the county of Buffalo and State of Nebraska, have invented certain new and useful Improvements in Pneumatic Tires, of which the following is a specification, reference being had to the accompanying drawings.

This invention relates to improvements in tires and has for its object to provide a tire of very novel and simple construction which is particularly adapted for use on motor vehicles and one which will provide a better cushioning effect than is possible with tires of this character as at present constructed.

Another object of the invention resides in the provision of an outer tire casing and an inner inflatable tube, and a plurality of annular elements arranged between the casing and the tube and bearing on said tube at opposite points thereby preventing longitudinal movement of the tube.

A further object of the invention is to provide a pneumatic tire having an outer casing consisting of a metallic tread portion and annular flexible side portions secured at one end to the tread, said flexible sides having steel rings secured in their edges and adapted to bear at opposite points upon the inner inflatable tube of the tire.

A still further object of the invention is to provide a pneumatic tire of such construction that it may be easily and quickly attached to or detached from the rim of the wheel, said tire being composed of a minimum number of parts thus materially reducing its cost of construction, the tire being further provided with efficient means for rendering the same puncture-proof and increasing its durability.

With the above and other objects in view, the invention consists of the novel features of construction, combination and arrangement of parts hereinafter fully described and claimed, and illustrated in the accompanying drawings, in which—

Figure 1 is a side elevation of a vehicle wheel provided with a tire embodying our improvements; Fig. 2 is an enlarged section taken on the line 2—2 of Fig. 1.

Referring more particularly to the drawings 5 designates the flexible steel tread plate of my improved tire, and 6 the flexible side portions preferably of leather. The tread plate 5 and the leather side members 6 form the outer casing within which the inflatable tube 7 is adapted to be arranged as in the ordinary pneumatic tire. The flexible steel tread 5 is preferably longitudinally corrugated as shown in the drawings to prevent the wheel skidding or slipping upon icy surfaces. It will be observed upon reference to Fig. 2 that the longitudinal edges of the annular metallic tread are outwardly bent or curved as shown at 5′ in order to obviate the liability of the same cutting through the leather sides 6 of the tire casing.

It is one of the principal objects of our invention to provide a tire which will be extremely durable and in which the wear upon the inner tube thereof is reduced to a minimum. We obtain this desirable result by providing means whereby the compression is directed upon the inner tube from opposite points, such means also providing a non-extensible case for the tube, and preventing longitudinal movement of the same. To this end annular steel rings 8 are fixed in the edges of the annular flexible casing sections 6, the edges of said flexible side portions being bent around the steel rings 8 as shown at 6′.

In order to provide means for securing the leather casing portions 6 to the metallic tread 5 and to protect the inflatable tube 7, we provide the annular flexible split strips 9 which are riveted or otherwise secured at one of their edges to the metallic tread 5 as indicated at 10. These leather rings are applied as shown at 11 to receive one edge of the side portions 6 of the tire casing containing the steel rings 8. The edges of the split portion of the members 9 are disposed upon the lapped-over edges of the leather sides 6 and are secured thereto by the stitching 12. A similar leather split ring 9′ is also secured to the other edges of the side portions 6 of the tire casing but is not fastened or secured to any other part as are the other parts 9 previously described. In this manner it will be observed that the leather side portions of the tire casing are securely fastened to the metallic tread of the tire, the steel rings in the outer edges of said leather portions being disposed beneath the edges of the metallic tread and therefore out of contact with the ground surface, thus preventing wear upon the leather. The steel rings 8 in the inner edges of the flexible portions 6 provide means whereby the tire may be easily and quickly attached to or detached from the rim of a vehicle wheel as will be more fully hereinafter set forth.

As clearly shown in Fig. 2 of the drawings, when the tire is secured in the rim of the wheel, the steel rings 8 bear at opposite points upon the inner compressible tube 7. These rings thus compress the inner tube upon opposite sides of its transverse center and also provide an inextensible case for said tube thereby preventing longitudinal movement or creeping of the same. In this manner the life of the tube will be materially increased and a much better cushioning effect is obtainable. Frictional contact between the tire casing and the inner tube is also reduced to a minimum, the annular leather strips 9 and 9' readily giving under pressure upon the metallic tread 5 as the inner tube is transversely extended by the compression of the air within the same. It will further be noted that the metallic tread plate 5 effectually protects the inner tube 7 from external puncture. The leather side portions 6 of the casing are also provided with one or more rows of lugs 14 which prevent wear upon said sides and hold the same out of contact with curbing or the sides of ruts in which the wheel may be disposed. These lugs 14 may be of any desired form and attached to the leather and side pieces 6 in any preferred manner.

As shown in the drawing the tire is adapted to be disposed in the rim R of the vehicle wheel W by forcing the inner rings 8 inwardly and compressing the inner tube 7 slightly whereby said rings may be disposed within the curved edge portions of the wheel rim in the manner of the ordinary detachable tire. Upon inflating the inner tube of the tire, the same assumes the form shown in Fig. 2 and acts to retain the inner rings 8 of the tire casing within the wheel rim.

From the foregoing it is believed that the construction and advantages of our improved motor vehicle tire will be readily understood without necessitating any further explanation.

The tire is extremely simple of construction and may therefore be manufactured at a low cost.

By providing a metallic and leather tire casing for the inner tube, the durability of the tire is greatly increased. This tire casing effectually protects the inner tube and the means provided produces a better cushioning effect and also materially reduces the wear upon said tube.

While we have shown and described the preferred construction and arrangement of the various parts, it will be understood that the tire may be greatly modified in its construction without departing from the essential feature or sacrificing any of the advantages thereof.

Having thus described the invention what is claimed is:—

A pneumatic tire comprising a casing consisting of a metal tread plate having its opposite edges outwardly curved, flexible side portions, a steel ring secured in each edge of the side portions, annular leather strips secured at one of their edges to the tread plate and split to receive the outer edges of the flexible sides of the tire casing, said strips and sides being sewed together to retain the steel rings in said strips, similar split strips to receive the rings in the other edges of the sides of the tire case, said tire casing being adapted to receive an inner inflatable tube, the steel rings bearing on said tube at opposite points to prevent longitudinal movement of the tube under pressure.

In testimony whereof we hereunto affix our signatures in the presence of two witnesses.

JOHN W. HAASE.
ERNEST H. HAASE.

Witnesses:
 A. T. REYNOLDS,
 ELMA HANNEMAN.

---

Copies of this patent may be obtained for five cents each, by addressing the "Commissioner of Patents, Washington, D. C."